United States Patent
Imhasly (10) Patent No.: US 8,851,042 B2
(45) Date of Patent: Oct. 7, 2014

(54) INSERT FOR A CYLINDER OF AN INTERNAL COMBUSTION ENGINE

(75) Inventor: David Imhasly, Winterthur (CH)

(73) Assignee: Wärtsilä Switzerland Ltd. (CH)

( * ) Notice: Subject to any disclaimer, the term of this patent is extended or adjusted under 35 U.S.C. 154(b) by 0 days.

(21) Appl. No.: 13/490,190

(22) Filed: Jun. 6, 2012

(65) Prior Publication Data

US 2013/0139780 A1    Jun. 6, 2013

(30) Foreign Application Priority Data

Jun. 16, 2011 (EP) .................................. 11170101

(51) Int. Cl.
*F02F 1/00*    (2006.01)
*F02F 1/18*    (2006.01)
*F16J 10/04*   (2006.01)
*F02B 77/04*   (2006.01)

(52) U.S. Cl.
CPC . *F02B 77/04* (2013.01); *F02F 1/18* (2013.01); *F16J 10/04* (2013.01); *F02F 1/00* (2013.01)
USPC ...................................... 123/193.2; 123/193.4

(58) Field of Classification Search
USPC ............. 123/193.2, 193.1, 193.6, 193.4, 659, 123/660; 277/591, 499, 445
See application file for complete search history.

(56) References Cited

U.S. PATENT DOCUMENTS

| | | | |
|---|---|---|---|
| 3,489,130 A * | 1/1970 | Polidan et al. .............. | 123/193.4 |
| 3,548,721 A * | 12/1970 | Eisennegger .................. | 92/153 |
| 4,253,435 A * | 3/1981 | McCandless .............. | 123/193.6 |
| 4,590,901 A * | 5/1986 | Mizuhara .................... | 123/193.6 |
| 4,848,212 A * | 7/1989 | Kawano et al. .................. | 92/158 |
| 5,033,426 A * | 7/1991 | Reichenbach et al. ...... | 123/193.3 |
| 5,085,185 A * | 2/1992 | Heshmat ..................... | 123/193.6 |
| 5,329,809 A * | 7/1994 | Sellnau et al. .............. | 73/115.02 |
| 5,490,445 A * | 2/1996 | Rao et al. ......................... | 92/155 |
| 6,164,260 A * | 12/2000 | Bock .......................... | 123/193.2 |
| 7,484,493 B2 * | 2/2009 | Bischofberger et al. ... | 123/193.3 |
| 2009/0039605 A1 * | 2/2009 | Poola et al. .................... | 277/434 |
| 2010/0319661 A1 | 12/2010 | Klyza | |
| 2010/0326391 A1 * | 12/2010 | Mierisch et al. ........... | 123/193.6 |
| 2011/0100316 A1 * | 5/2011 | Moore et al. .............. | 123/193.5 |

FOREIGN PATENT DOCUMENTS

| | | |
|---|---|---|
| DE | 1902502 B1 | 11/1970 |
| DE | 19811780 C1 | 8/1999 |
| DE | 102005037203 A1 | 2/2007 |
| DE | 102005037205 A1 | 2/2007 |
| EP | 0684411 A1 | 11/1995 |
| EP | 1061294 A2 | 12/2000 |

(Continued)

OTHER PUBLICATIONS

Mahle GmbH, Oil Carbon on the Piston—Simply Gone, Press Release, Sep. 2008, 1-2.

*Primary Examiner* — Noah Kamen
*Assistant Examiner* — Long T Tran
(74) *Attorney, Agent, or Firm* — Standley Law Group LLP (57) ABSTRACT

To remove contaminations in the area of a fire land (6) of a piston (5) an insert is provided (1) which sweeps the outer circumference of the piston (5) upon passing the top dead center and in so doing scrapes accumulating contaminations. The insert is formed of a first annular member (2) in which a second annular member (3) is inserted in a groove (9).

16 Claims, 8 Drawing Sheets

(56) References Cited

FOREIGN PATENT DOCUMENTS

| | | | |
|---|---|---|---|
| EP | 1061294 | B1 | 12/2000 |
| FR | 2763362 | A1 | 11/1998 |
| GB | 2172084 | A * | 9/1986 |
| WO | WO 2008/074277 | A1 | 6/2008 |

* cited by examiner

INSERT FOR A CYLINDER OF AN INTERNAL COMBUSTION ENGINE

CROSS-REFERENCE TO RELATED APPLICATIONS

This application is entitled to, and claims benefit of, a right of priority under 35 USC §119 from European Application Number 11170101.7 filed on Jun. 16, 2011 which is hereby incorporated by reference in its entirety.

TECHNICAL FIELD

The exemplary embodiments relate to an insert for a cylinder of an internal combustion engine and to an internal combustion engine including at least one insert of this type.

The embodiments relate in particular to an anti-polishing ring, as it is called, that is mounted in a cylinder of an internal combustion engine so as to remove contaminations in the area of a fire land of a piston of the internal combustion engine.

BACKGROUND

A traditional anti-polishing ring consists of an annular member inserted at an upper area of a cylinder or a cylinder liner so as to sweep during operation of the internal combustion engine the area of the fire land, i.e. the upper area of the piston with respect to the top dead center, and hereby to remove contaminations resulting from incomplete combustion or the like.

This annular member is to form a constricted portion of the inner wall of the cylinder. Some wear of the annular insert by contacting the fire land and the inner circumferential surface of the annular insert is accepted. The wear of the annular insert can be restricted within particular limits, however, by selection of the material.

It is one object of the exemplary embodiments herein to provide an insert for a cylinder of an internal combustion engine for removing contaminations in the area of a fire land of a piston guided within the cylinder which insert has an improved service life and at the same time a more effective function compared to the state of the art.

SUMMARY OF THE EXEMPLARY EMBODIMENTS

In accordance with the exemplary embodiments, an insert for a cylinder of an internal combustion engine is provided for removing contaminations in the area of a fire land of a piston guided within the cylinder upon passing a top dead center position of the piston. Said insert includes at least one first annular member fixed to a radial recess of the cylinder and at least one second annular member inserted in a radial groove of the first annular member which is formed in the first annular member. According to the exemplary embodiments, the second annular member is arranged in the groove to be radially movable relative to the first annular member and to be axially substantially immobile.

In the insert according to the exemplary embodiments thus a first annular member is inserted in the cylinder as support member and in said first annular member the second annular member is provided as the actual anti-polishing ring. Said second annular member having the function of scraping contaminations in the area of the fire land is axially substantially immobile in the groove so that the second annular member can fulfill its function. Furthermore, the second annular member is radially movable within the groove so that on certain conditions the function of removing contaminations can be improved by said radial mobility. In particular, the radial position is automatically centered during operation of the associated internal combustion engine.

In accordance with a preferred embodiment, the inner diameter of a radially inner surface of the second annular member is arranged so that the radially inner surface of the second annular member sweeps an outer circumferential surface of the piston in the area of the fire land when passing the top dead center so that the radially inner surface of the second annular member can contact the outer circumferential surface of the piston. With such arrangement an excellent efficiency for removing contaminations in the area of the fire land is brought about and in connection with the radial mobility of the second annular member the service life of the insert is improved.

According to a preferred embodiment, the second annular member is radially movable within the groove so that the radially inner surface of the second member is substantially centered with respect to the outer circumferential surface of the piston upon sweeping the outer circumferential surface of the piston in the area of the fire land when passing the top dead center. Hereby an optimum function of the insert is entailed, as substantially all circumferential areas of the piston can be swept evenly by the second annular member so that it is possible to completely remove the contaminations.

According to a preferred embodiment, the diameter at the bottom of the groove is arranged to be larger than the diameter of the radially outer surface of the second annular member at least by such amount that the radially inner surface of the second member is substantially centered with respect to the outer circumferential surface of the piston upon sweeping the outer circumferential surface of the piston in the area of the fire land when passing the top dead center. Hereby an axial mobility of the second annular member is provided which can be brought about and set by the dimension of the diameter at the bottom of the groove.

According to a preferred embodiment, the degree of radial mobility of the second annular member is arranged relative to the first annular member taking tolerances of centering the piston with respect to the cylinder especially due to deviations caused thermally, by manufacture and/or operation into account. Taking the specific use and the specifications of the associated internal combustion engine into consideration, the radial mobility of the second annular member can thus be optimally configured by taking tolerances of centering the piston with respect to the cylinder into account which are resulting from a cyclic load, wherein also deviations caused by manufacture or operation can be considered.

By this arrangement further degrees of freedom are thus resulting during manufacture not only of the insert but also of the piston and the associated members, because larger tolerances in the area of the fire land may possibly be accepted.

According to a preferred embodiment, the diameter of a radially inner surface of the first annular member is larger than the diameter of the radially inner surface of the second annular member. It is hereby permitted that the radially inner surface of the second annular member gets into contact with the outer diameter of the piston, whereas the radially inner surface of the first annular member is not exposed to any contact so that the service life of this member is improved.

In accordance with a preferred embodiment, the radial recess in which the first annular member is fixed is open toward the end of the cylinder at the top dead center and the first annular member is adapted to be press-fitted into the radial recess. By this arrangement, on the one hand, the insert can be fixedly mounted to the cylinder so that an axially fixed position is ensured. On the other hand, it is possible to exchange the entire insert if necessary.

According to a preferred embodiment, the second annular member is in the form of an open ring having a ring joint. Hereby the second annular member can be inserted in the groove without the entire insert having to be removed. The ring joint can be designed so that by the bias of the second annular member the ring joint is tensioned so that the second annular member acts like a closed member. For this purpose, mutually reversed radial shoulders can be provided, for instance, at the ring joint. Alternatively the ring joint can also be provided with groove and tongue.

According to a preferred embodiment, in the radially inner surface of the first annular member a second groove is provided in addition to the groove and another second annular member is inserted in the second groove. This entails an improved functionality of the system, because two annular members serve for scraping contaminations and thus at the same time the service life of the individual members is improved.

According to a preferred embodiment, the first annular member is made of a first ring and a second ring which are adapted to be press-fitted into the radial recess, wherein an annular indentation is formed between the first ring and the second ring, when the first ring and the second ring are made to axially contact each other, the second annular member being arranged in the annular indentation.

Such arrangement permits an improved and simplified assembly of the insert, especially when preferably a closed ring is used. For this purpose, according to the exemplary embodiments, the first ring is press-fitted, then the second annular member is inserted and the second ring is pressed onto the first ring so that the second annular member is arranged in the resulting annular indentation.

In accordance with a preferred embodiment, the annular recess constitutes a radially inwardly open annular gap as a groove which is penetrated by a radially inwardly projecting shoulder of the second annular member, wherein the axial dimension of the annular gap is smaller than the axial dimension of the annular indentation, the shoulder constituting the radially inner surface of the second annular member.

An arrangement of this type can cause, on the one hand, an axial securing of the second annular member, while a closed ring can optionally be used as second annular member. However, the use of an open ring is still possible and offers the respective advantages. The function of scraping contaminations in the area of the fire land is brought about here by the shoulder of the second annular member which projects through the resulting annular gap.

According to a preferred embodiment, the second annular member includes a base having an axial dimension substantially corresponding to the axial dimension of the indentation, while the shoulder extends radially inwardly from the base and has an axial dimension substantially corresponding to the axial dimension of the annular gap.

An arrangement of this type can entail an improved service life of the insert, because, on the one hand, a closed ring can be used as second annular member and, on the other hand, the base being arranged in the indentation prevents the ring from moving radially outside particular tolerances. Especially the second annular member can be prevented from falling out into the combustion chamber of the associated internal combustion engine even in case of destruction of the second annular member. In addition, the stability of the second annular member is improved by the base.

According to a preferred embodiment, the second annular member includes a base having a larger expansion than the shoulder in the axial direction of the second annular member. Preferably, the base exhibits the form of an expansion extending in one axial direction, of an expansion extending in both axial directions of the second annular member and having a beveled transition between the shoulder and the expansion, of a single expansion extending in an axial direction having a bevel at the transition between the shoulder and the expansion, of a beveled expansion extending in one axial direction of the second annular member or of a bevel extending in both axial directions of the second annular member. The shape of the shoulder and especially the configuration of the cross-section of the second annular member are not restricted to the described shapes. What is especially advantageous with this embodiment, however, is generally an expansion at the radially outer area of the second annular member relative to the shoulder projecting radially inwardly from the base.

According to a preferred embodiment, an internal combustion engine comprises a cylinder in which a piston is guided, wherein furthermore at least one insert as defined above is provided.

In accordance with a preferred embodiment, the cylinder includes a cylinder liner in which the piston is guided, the radial recess in which the at least one insert is mounted being formed in the cylinder liner.

According to a preferred embodiment, two of the afore-discussed inserts are provided to be axially adjacent in the recess. Hereby the function of the anti-polishing ring can be improved, on the one hand, and the degrees of freedom can be increased when selecting specific dimensions.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

First Embodiment

Figure 1:
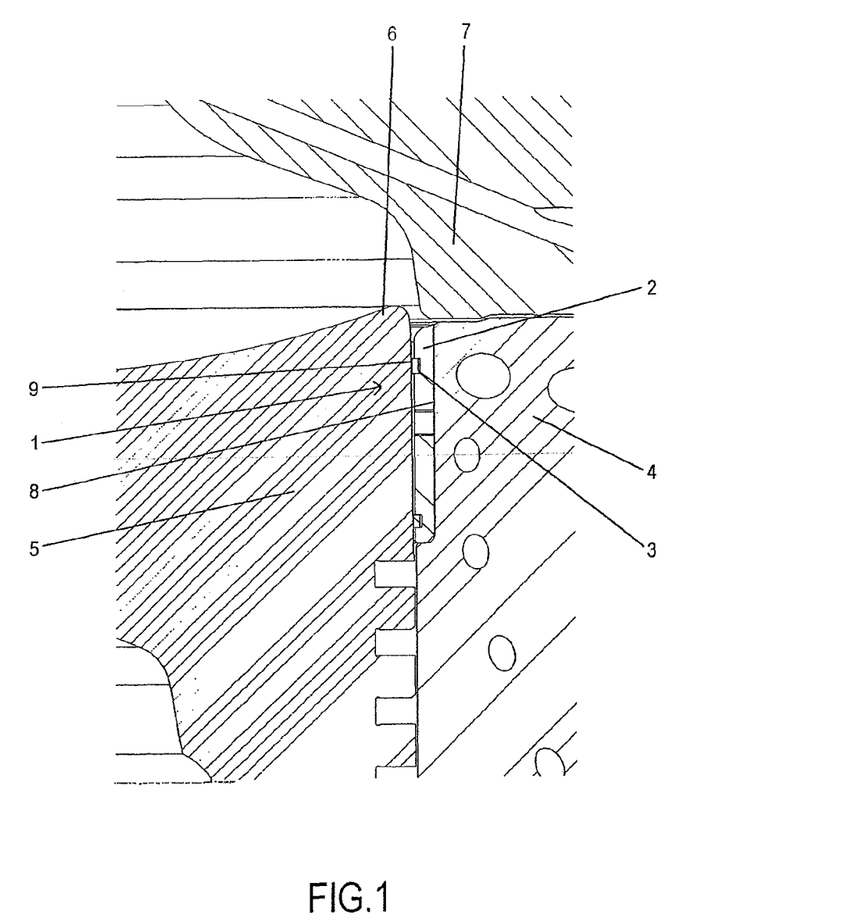
FIG. 1 is a sectional view of an area of an internal combustion engine including an insert according to the first embodiment of the invention.

FIG. 1 illustrates a sectional view of an area of an internal combustion engine in the neighborhood of the transition between a cylinder 4 and a cylinder head 7. This view shows the piston 5 in the area of the top dead center.

The piston 5 is slidably arranged in the cylinder 4 in a known manner and with its upper side restricts, jointly with the cylinder head 7, a combustion chamber into which, in the case of a diesel combustion engine, fuel is injected through an injection nozzle not shown after the compression of sucked air. Moreover, a known internal combustion engine of this type includes at least one exhaust valve, which is not shown for simplicity's sake, however.

At its upper area the piston 5 includes a portion referred to as fire land 6. In the area of said fire land 6 contaminations are accumulating at the outer circumference of the piston when the internal combustion engine is in operation. Such contamination occurs as fuel especially when heavy oil is used.

The cylinder 4 in FIG. 1 includes a radial recess 8 which is open upwardly, i.e. in the direction of the top dead center or toward the cylinder head 7. The recess is arranged in a substantially cylindrical shape. In the embodiment of FIG. 1 in said recess 8 a first annular member 2 made of a closed ring of a metallic material is provided. The outer diameter of the first annular member 2 is configured so that an interference fit is resulting with respect to the inner diameter surface of the recess 8. Said interference fit is arranged so that during operation a tight fit of the first annular member is ensured so that an axial displacement of the first annular member 2 is avoided. As an alternative or in addition, the first annular member 2 can be secured against axial displacement by a circlip or a similar measure.

In the first annular member 2 a radial groove 9 is provided which is open radially inwardly. A second annular member having an inner diameter which is slightly larger than the inner diameter of the first annular member 2 is inserted in said radial groove 9. The groove includes a bottom constituted by a circumferential surface which is formed in the groove 9 and faces radially inwardly. The radial dimension of this surface forming the bottom of the groove 9 is larger than the outer diameter of a second annular member 3 which is inserted in the groove 9.

The second annular member 3 includes a ring joint so that the ring can be inserted into the groove 9 of the first annular member 2 after elastic deformation of the second annular member 3. By the elastic property of the second annular member 3 the ring joint can be kept engaged under tension so that especially due to the specific configuration of the ring joint with a shoulder or the like the characteristic of a closed ring can result.

Since the outer diameter of the second annular member 3 is smaller than the diameter of the surface at the bottom of the groove 9, the second annular member 3 can move in the plane that is perpendicular to the axial direction of the piston and the second annular member 3, respectively.

The inner diameter of the second annular member 3 is arranged so that when passing the top dead center of the piston 5 the outer diameter is swept by the second annular member 3 in the area of the fire land 6 and may contact especially the outer circumference in the area of the piston 5. By such contacting or sweeping, respectively, contamination depositing in this area is scraped by the outer circumference of the piston 5 in the area of the fire land 6.

Especially in large internal combustion engines, such as e.g. those diesel combustion engines that are provided for powerful stationary applications or for marine propulsions, relative tolerances are resulting as regards manufacture or from the cyclic operation of the internal combustion engine, for instance due to different thermal loads of the members such as e.g. the piston. By reason of the large dimension in those internal combustion engines, great absolute deviations are thus resulting, for example, regarding the concentric alignment of the outer circumferential surface of the piston 5 in the area of the fire land 6. The arrangement according to the exemplary embodiments exhibiting the second annular member 3 which is received axially movably within the groove 9 effectuates an automatic centering of the inner circumferential surface of the second annular member 3 relative to the outer diameter of the piston 5 in the area of the fire land 6. Hereby a uniform distance from contaminations accumulating within the area of the fire land 6 can be brought about. Moreover, an excessive pressure load between the inner circumferential surface of the second annular member 3 and the outer circumference in the area of the fire land 6 is counteracted, because the axially movable arrangement of the second annular member effectuates a constant adjustment of the position of the second annular member 3.

In accordance with the exemplary embodiments, the first annular member 2 can be removed from the radial recess 8 of the cylinder 4 during maintenance work and can be replaced with a new component part. As an alternative, the second annular member 3 can be exchanged during maintenance work. Since the inner diameter of the first annular member 2 is larger than the diameter of the inner circumferential surface of the second annular member 3, merely the second annular member 3 is subjected to wear due to the operation of the internal combustion engine.

The first annular member 2 can be manufactured of 34CrMo4, for example. The second annular member 3 can be manufactured, for instance, as a temperature-resistant cast ring. This information is merely exemplary, however, and other materials can be used as long as the function of the insert is ensured. Basically, however, the material of the second annular member 3 should be softer than the material of the piston 5 at least in the area of the fire land 6 so that wear occurs at the second annular member 3 and thus wear of the piston 5 can be prevented.

As an alternative, in an internal combustion engine a second insert can be provided in the radial recess 8 so that two substantially identical inserts are provided. In this case, the efficiency for scraping the contaminations is largely improved. For this purpose, two first annular members 2 each including a radial groove 9 are inserted in the recess 8. A second annular member 3 is then inserted in the radial groove 9.

As a further alternative, the insert may consist of a first annular member 2 in which two axially spaced radial grooves 9 are provided into each of which a second annular member 2 is inserted.

Second Embodiment

A second embodiment of the invention is described with reference to FIG. 2 and FIG. 3, whereas further modifications of this embodiment are illustrated in FIGS. 4 to 8.

Figure 2:
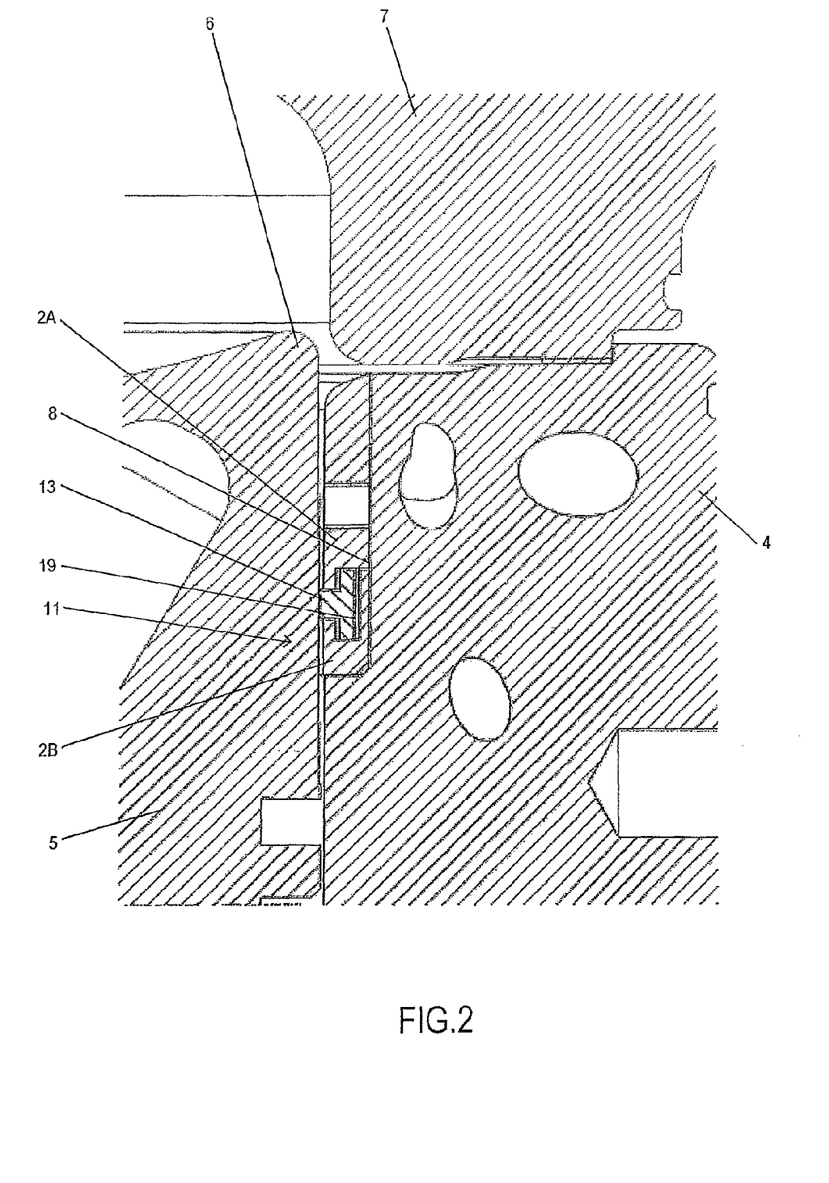
FIG. 2 is a sectional view of an area of an internal combustion engine including an insert according to the second embodiment of the invention.
Figure 3:
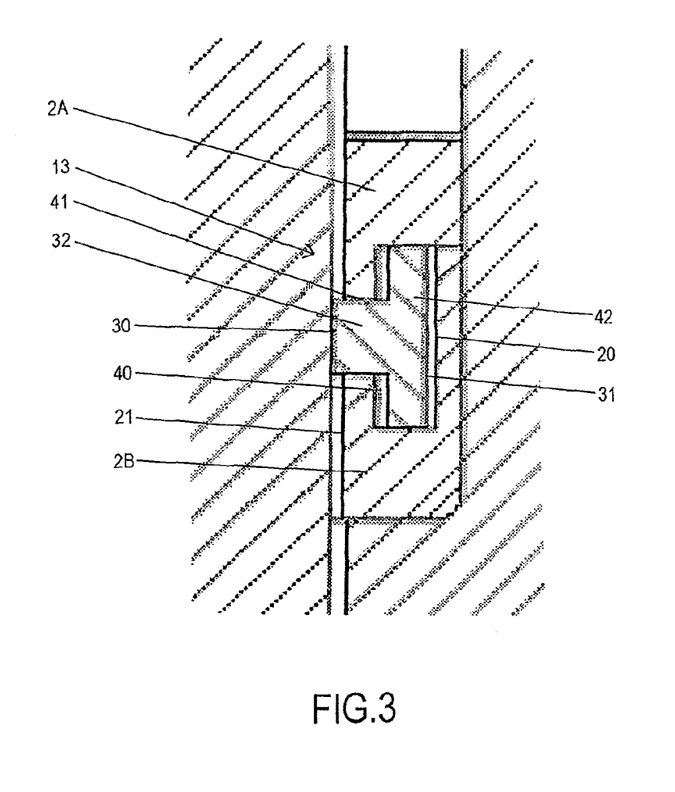
FIG. 3 is a sectional view of an enlarged cut-out of the insert of the second embodiment of the invention.

FIG. 2 shows, in a view similar to FIG. 1, a sectional view of an internal combustion engine in the area of the transition between the cylinder 4 and the cylinder head 7. In the cylinder likewise a radial recess 8 is provided. A first annular member consisting of two separate rings as partial member 2A and partial member 2B in the second embodiment is inserted in this radial recess 8. At the lower side of the radial recess 8 the lower partial member 2B is press-fitted. The upper partial member 2A is press-fitted into the radial recess 8 on said lower partial member 2B. The lower partial member 2B includes an upwardly facing shoulder adapted to contact an axially aligned surface of the upper partial member 2A. In the press-fitted state the partial members 2A, 2B form a radial groove in the form of an annular indentation 40 which forms an annular gap open radially inwardly (toward the combustion chamber) as a groove.

The partial members 2A, 2B are likewise press-fitted into the radial recess 8 with interference fit.

The second annular member 13 according to the second embodiment includes a radially inwardly projecting shoulder 32 extending from a base 42 of the second annular member 13. The base 42 has a larger axial dimension than the shoulder 32. The axial dimension of the shoulder 32 substantially corresponds to the axial dimension of the open annular gap when the partial members 2A, 2B contact each other.

In the assembled state the partial members 2A, 2B form a radially inwardly facing surface having an inner diameter larger than the inner diameter which is provided at a radially inwardly facing surface of the shoulder 32. Thus, in the assembled state the shoulder 32 projects from the inwardly facing surface of the assembled partial members 2A, 2B.

The insert according to the second embodiment is assembled as follows. First the lower partial member 2B is press-fitted into the radial recess 8. Then the second annular member 13 is inserted from above into the indentation 40 still open at the top. Finally the upper partial member 2A is press-fitted into the radial recess 8 until it is made to contact the lower partial member 2B.

According to the second embodiment, the second annular member 13a can be in the shape of a closed ring. In particular a ring without an open ring joint can be used. Furthermore, the base 42 having axial dimensions enlarged vis-à-vis the shoulder 32 effectuates that in the assembled state the second annular member 13 is not allowed to jump out of the groove. Thus, also in the case of destruction of the second annular member, for instance by breaking into several sector elements, the second annular member is prevented from falling into the combustion chamber. Furthermore, the stability of the second annular member 13 can be improved by the reinforced base 42 and the closed design.

The first annular member according to the second embodiment, especially the lower partial member 2B includes a radially inwardly facing surface within the indentation 40 which has a larger diameter than the outwardly facing circumferential surface of the second annular member 13. Consequently, as in the first embodiment, the second annular member 13 is radially displaceable vis-à-vis the first annular member 2A, 2B in the assembled state and thus relative to the outer circumference of the piston 5. Consequently, according to the second embodiment, the same effects are achieved as those illustrated in the first embodiment.

As an alternative, as in the first embodiment two identical inserts can be inserted in a radial recess 8, whereby a largely improved effect is resulting. Alternatively, the insert of the first embodiment and the insert of the second embodiment can be used in combination in a radial recess 8.

Hereinafter several modifications of the second embodiment will be illustrated.

Figure 4:
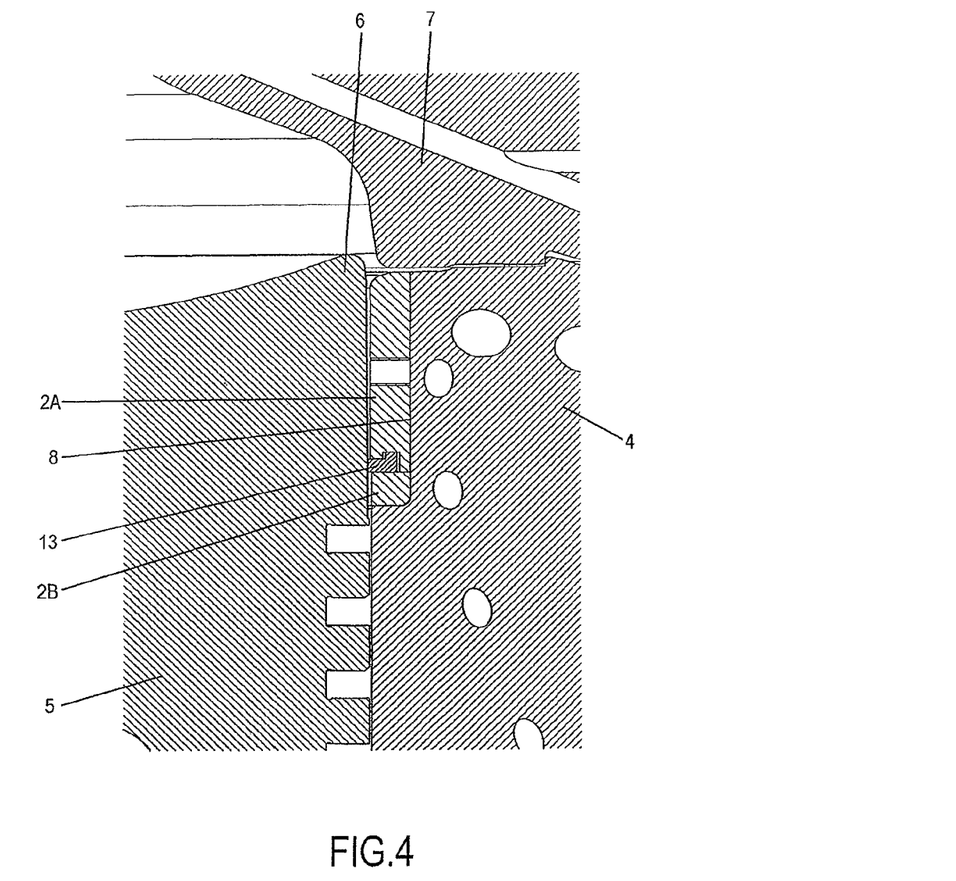
FIG. 4 is a sectional view of a first modification of the second embodiment of the invention.

FIG. 4 shows a first modification of the second embodiment. In this first modification partial members 2A, 2B as well as the second annular member 13 are modified. Especially the second annular member is provided with an expansion extending in axial direction which in the assembled state is located in a corresponding indentation in the partial member 2A. Hence in this modification the second annular member 13 is substantially L-shaped in cross-section.

Figure 5:
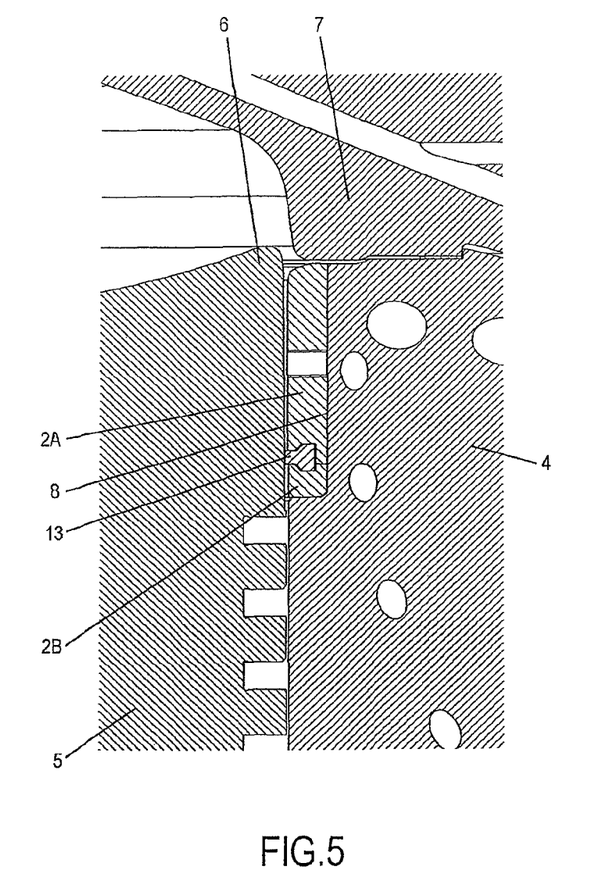
FIG. 5 is a sectional view of a second modification of the second embodiment of the invention.

In a second modification of the second embodiment as shown in FIG. 5 the second annular member 13 includes two expansions axially extending in opposite directions which exhibit a bevel at the transition between the shoulder 32 and the expansions.

Figure 6:
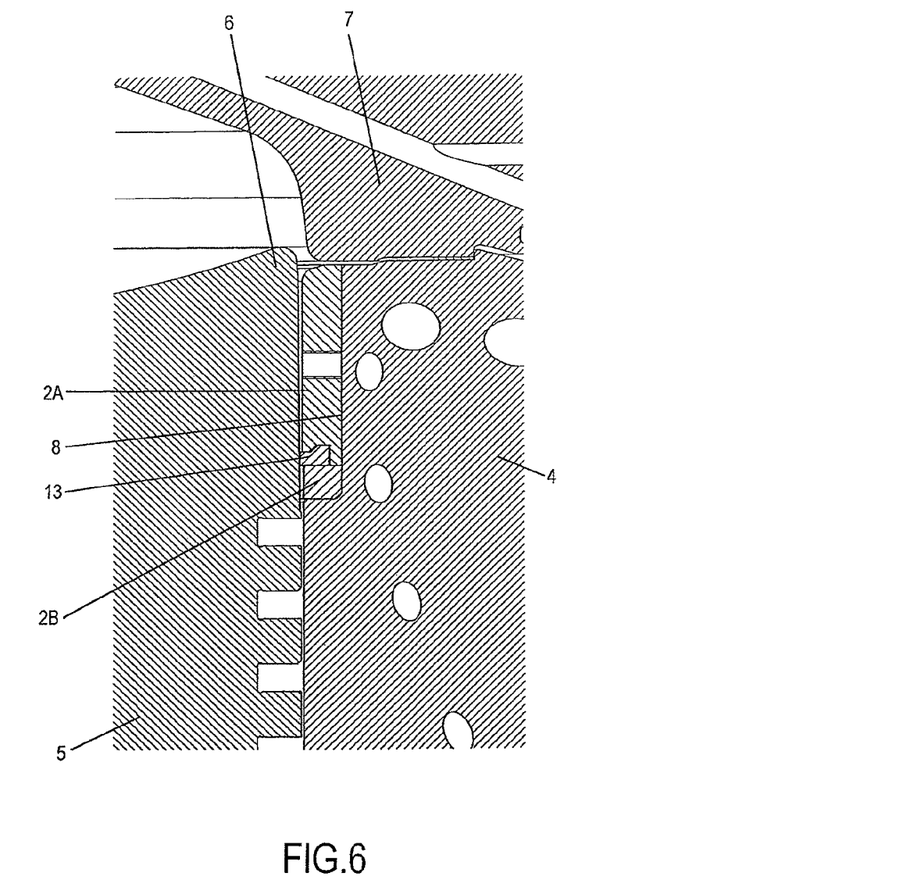
FIG. 6 is a sectional view of a third modification of the second embodiment of the invention.

In a third modification of the second embodiment as shown in FIG. 6 merely an expansion in the axial direction of the second annular member 13 is provided, wherein a bevel is provided at the transition between the shoulder 32 and the expansion.

Figure 7:
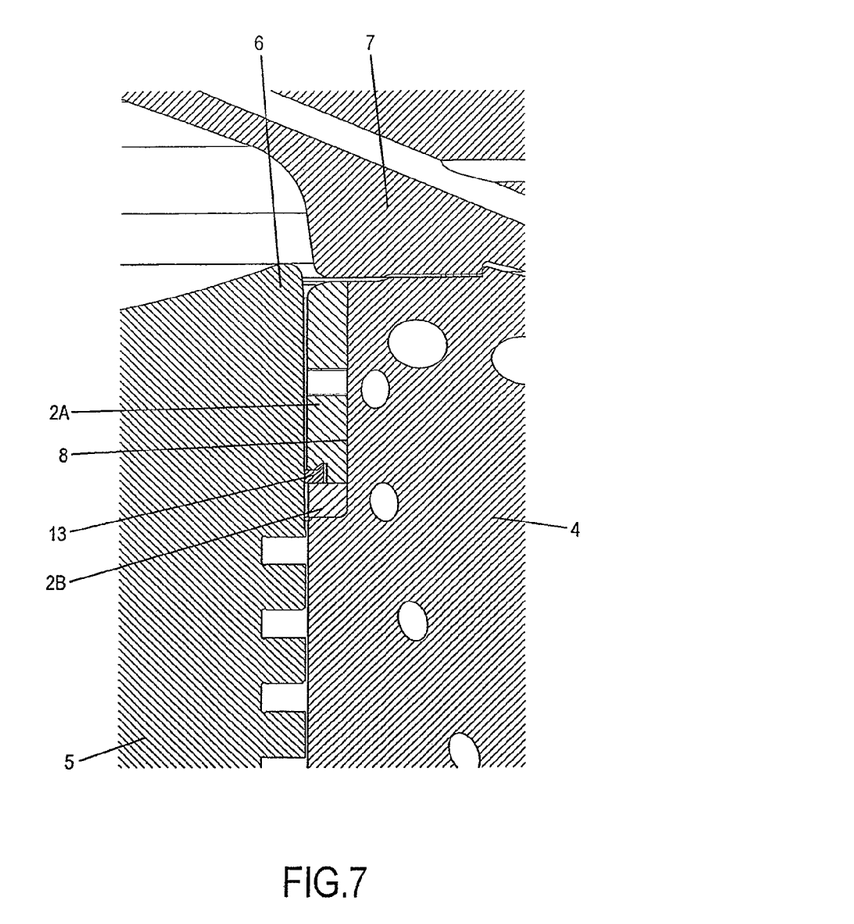
FIG. 7 is a sectional view of a fourth modification of the second embodiment of the invention.

In a fourth modification of the second embodiment as shown in FIG. 7 an expansion extending in the axial direction which altogether represents a bevel extending from the shoulder 32 is provided at the second annular member 13.

Figure 8:
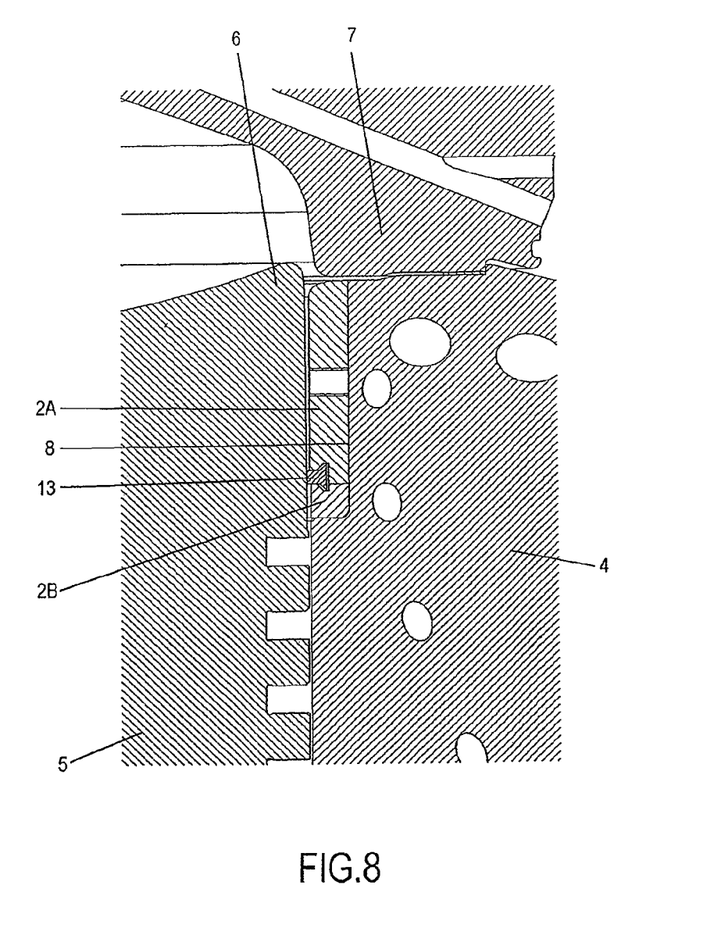
FIG. 8 is a sectional view of a fifth modification of the second embodiment of the invention.

In a fifth modification of the second embodiment a second annular member 13 is provided which includes two expansions extending axially in opposite directions which are formed altogether as bevels starting from the shoulder 32.

The afore-described modifications prove that the second embodiment is not to be restricted to the specific configuration as illustrated and the second annular member 13 can be modified together with the partial members 2A, 2B so that the effects and advantages are the same as represented in the second embodiment. It has to be noted in this context that the partial members 2A, 2B can be adapted to the shapes of the second annular member 13 as is also illustrated in the Figures.

The embodiments herein been illustrated when applied to a diesel combustion engine. In particular in the case of large-volume diesel combustion engines there is a need to free the outer circumference in the area of the fire land 6 from contaminations, as the fuel used for those diesel combustion engines frequently is heavy oil. However, embodiments of the invention are also applicable to other construction types, especially spark-ignition engines, four-stroke or two-stroke diesel engines.

In the Figures the radial recess 8 has been shown as a recess formed directly in the cylinder 4. However, the recess 8 can also be formed in a liner inserted in the cylinder.

The selection of material stated in the first embodiment can also be applied to the second embodiment. On the whole, this selection of material is not restricted, however.

In the second embodiment the second annular member 13 has been shown as a closed ring. Also in this case, however, an open ring having a ring joint can be used as described in the first embodiment.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

The invention claimed is:

1. An insert for a cylinder of an internal combustion engine for removing contaminations in the area of a fire land of a piston adapted to be guided in the cylinder when passing a top dead center position of the piston, comprising
    a first annular member press-fit in a radial recess of the cylinder, and
    a second annular member inserted in a radial groove of the first annular member,
    wherein the second annular member is radially movable and is axially substantially immobile in the radial groove relative to the first annular member.

2. The insert according to claim 1, wherein the inner diameter of a radially inner surface of the second annular member is arranged so that the radially inner surface of the second annular member wipes an outer circumferential surface of the piston in the area of the fire land when passing the top dead center so that the radially inner surface of the second annular member can contact the outer circumferential surface of the piston.

3. The insert according to claim 2, wherein the second annular member is radially movable in the groove such that the radially inner surface of the second member is substantially centered with respect to the outer circumferential surface of the piston when sweeping the outer circumferential surface of the piston in the area of the fire land upon passing the top dead center.

4. The insert according to claim 2, wherein a diameter of the groove is arranged to be larger than the diameter of the radially outer surface of the second annular member at least by such amount that the radially inner surface of the second member is substantially centered with respect to the outer circumferential surface of the piston when sweeping the outer circumferential surface of the piston in the area of the fire land upon passing the top dead center.

5. The insert according to claim 1, wherein a diameter of a radially inner surface of the first annular member is larger than a diameter of the radially inner surface of the second annular member.

6. The insert according to claim 1, wherein the radial recess in which the first annular member is fixed is open toward an end of the cylinder at the top dead center and the first annular member is sized to be press-fitted into the radial recess.

7. The insert according to claim 1, wherein the second annular member is in the form of an open ring having a ring joint.

8. The insert according to claim 1, wherein a second groove is provided in addition to the groove in the radially inner surface of the first annular member and another second annular member is inserted in the second groove.

9. An internal combustion engine comprising
a cylinder in which a piston is guided, and
an insert according to claim 1.

10. The internal combustion engine according to claim 9, further comprising a cylinder liner in which the piston is guided, the radial recess in which the first annular member is mounted being formed in the cylinder liner.

11. The internal combustion engine according to claim 9, further comprising a second insert positioned within the radial recess of the cylinder and axially adjacent to the first insert.

12. An insert for a cylinder of an internal combustion engine for removing contaminations in the area of a fire land of a piston adapted to be guided in the cylinder when passing a top dead center position of the piston, comprising
a first annular member sized to be fixed in a radial recess of the cylinder, said first annular member comprising a first ring and a second ring which provide an annular indentation when the first and second rings are made to coaxially contact each other,
a second annular member inserted in the annular indentation,
wherein the second annular member is radially movable and is axially substantially immobile in the annular indentation relative to the first annular member.

13. The insert according to claim 12, wherein the annular indentation forms a radially inwardly open annular gap as a groove which is penetrated by a radially inwardly projecting shoulder of the second annular member, an axial dimension of the annular gap being smaller than an axial dimension of the annular indentation, wherein the shoulder forms a radially inner surface of the second annular member.

14. The insert according to claim 12, wherein the second annular member includes a base having an axial dimension that is substantially equal to an axial dimension of the indentation, where the shoulder extends radially inwardly from the base and has an axial dimension substantially corresponding to an axial dimension of the annular gap.

15. The insert according to claim 12, wherein an inner diameter of a radially inner surface of the second annular member is arranged so that the radially inner surface of the second annular member wipes an outer circumferential surface of the piston in the area of the fire land when passing the top dead center so that the radially inner surface of the second annular member can contact the outer circumferential surface of the piston.

16. The insert according to claim 12, wherein the second annular member is radially movable in the annular indentation such that a radially inner surface of the second member is substantially centered with respect to an outer circumferential surface of the piston when sweeping the outer circumferential surface of the piston in the area of the fire land upon passing the top dead center.

* * * * *